US006226718B1

United States Patent
Carpenter et al.

(10) Patent No.: US 6,226,718 B1
(45) Date of Patent: May 1, 2001

(54) METHOD AND SYSTEM FOR AVOIDING LIVELOCKS DUE TO STALE EXCLUSIVE/ MODIFIED DIRECTORY ENTRIES WITHIN A NON-UNIFORM ACCESS SYSTEM

(75) Inventors: Gary Dale Carpenter, Pflugerville; Mark Edward Dean; David Brian Glasco, both of Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/259,379

(22) Filed: Feb. 26, 1999

(51) Int. Cl.[7] .................................................. G06F 12/02
(52) U.S. Cl. .................... 711/152; 711/121; 711/143; 711/144; 711/145; 711/150; 711/168; 711/169
(58) Field of Search .................................. 711/121, 120, 711/143, 144, 145, 150, 152, 168, 173, 153, 169

(56) References Cited

U.S. PATENT DOCUMENTS 6,078,981 * 6/2000 Hill et al. ............................ 710/200
6,108,752 * 8/2000 VanDoren et al. ................... 711/117

* cited by examiner

Primary Examiner—Hiep T. Nguyen
(74) Attorney, Agent, or Firm—Casimer K. Salys; Felsman, Bradley, Vaden, Gunter & Dillon, LLP (57) ABSTRACT

A method for avoiding livelocks due to stale exclusive/ modified directory entries within a non-uniform memory access (NUMA) computer system is disclosed. A NUMA computer system includes at least two nodes coupled to an interconnect. Each of the two nodes includes a local system memory. In response to an attempt by a processor of a first node to read a cache line at substantially the same time as a processor of a second node attempts to access the same cache line, wherein the cache line has been silently cast out from a cache memory within the second node even though a coherency directory within the node still indicates the cache line is held exclusively in the second node, the processor of the second node is allowed to access the cache line only if the second node is an owning node of the cache line. The processor of the first node is then allowed to access the cache line.

10 Claims, 5 Drawing Sheets

| COHERENCY STATE | ACTION |
|---|---|
| node 12; Modified | |
| | READ request to node 12 |
| node 12; Pending-modified | |
| | RWITM request from owning node |
| node 12; Pending-shared | |
| | Retry READ request at node 11 |
| node 12; Shared | |

Fig. 5

METHOD AND SYSTEM FOR AVOIDING LIVELOCKS DUE TO STALE EXCLUSIVE/ MODIFIED DIRECTORY ENTRIES WITHIN A NON-UNIFORM ACCESS SYSTEM

CROSS REFERENCE TO RELATED APPLICATIONS

The present application is related to the following copending United States Patent Applications:

1. Ser. No. 09/259,300 entitled "METHOD AND SYSTEM FOR AVOIDING LIVELOCKS DUE TO COLLIDING WRITEBACKS WITHIN A NON-UNIFORM MEMORY ACCESS SYSTEM," filed on even date; and
2. Ser. No. 09/259,367 entitled "METHOD AND SYSTEM FOR AVOIDING LIVELOCKS DUE TO COLLIDING INVALIDATING TRANSACTIONS WITHIN A NON-UNIFORM MEMORY ACCESS SYSTEM," filed on even date.

All above-mentioned copending applications are assigned to the assignee of the present application.

BACKGROUND OF THE INVENTION

1. Technical Field

The present invention relates to a method and system for data processing in general, and in particular to a method and system for avoiding livelocks within a computer system. Still more particularly, the present invention relates to a method and system for avoiding protocol livelocks due to stale exclusive/modified directory entries within a non-uniform memory access computer system.

2. Description of the Prior Art

It is well-known in the computer arts that greater computer system performance can be achieved by combining the processing power of several individual processors to form a multiprocessor (MP) computer system. MP computer systems can be designed with a number of different topologies, depending on the performance requirements of a particular application. A symmetric multiprocessor (SMP) configuration, for example, is one of the simpler MP computer system topologies that are commonly used, in which resources such as a system memory are shared by multiple processors. The topology name "symmetric" stems from the fact that all processors within an SMP computer system have symmetric access to all resources within the system.

Although the SMP topology permits the use of relatively simple inter-processor communication and data sharing protocols, the SMP topology overall has a limited scalability and bandwidth, especially at the system memory level as the system scale increases. As a result, another MP computer system topology known as non-uniform memory access (NUMA) has emerged as an alternative design that addresses many of the limitations of the SMP topology, at the expense of some additional complexity.

A typical NUMA computer system includes a number of interconnected nodes. Each node includes at least one processor and a local "system" memory. The NUMA topology name stems from the fact that a processor has lower access latency with respect to data stored in the system memory at its local node than with respect to data stored in the system memory at a remote node. NUMA computer systems can be further classified as either non-cache coherent or cache coherent, depending on whether or not data coherency is maintained among caches in different nodes. The NUMA topology addresses the scalability limitations of the conventional SMP topology by implementing each node within a NUMA computer system as a smaller SMP system. Thus, the shared components within each node can be optimized for use by only a few processors, while the overall system benefits from the availability of larger scale parallelism with relatively low latency.

Despite all the various advantages, a NUMA system also has its fair share of problems, one of them being livelocks. For example, if a reading processor did not modify a cache line that was exclusive to the reading processor and instead cast out the cache line without informing a cache coherency directory, the cache coherency directory would still indicate that the reading processor has the cache line exclusively. Subsequent accesses to the cache line will be forwarded to the reading processor, which will indicate that the reading processor no longer has the cache line. A livelock can occur if a processor from a node different from the node that previously owned the cache line attempts to access the cache line at the same time the reading processor attempts to access the same cache line again. Consequently, it would be desirable to provide a method for avoiding protocol livelocks due to stale exclusive/modified directory entries within a NUMA computer system.

SUMMARY OF THE INVENTION

In accordance with the method and system of the present invention, a NUMA computer system includes at least two nodes coupled to an interconnect. Each of the two nodes includes a local system memory. In response to an attempt by a processor of a first node to read a cache line at substantially the same time as a processor of a second node attempts to access the same cache line, wherein the cache line has been silently cast out from a cache memory within the second node even though a coherency directory within the home node still indicates the cache line is held exclusively in the second node. The receipt of the request from the second node, the owning node, allows the node controller to infer that second node no longer has a modified copy of the line, and the node controller can update the directory with this new information. The owning node is the node with the most recent copy of the cache line exist. Subsequent requests will find the data in the system memory at the home node.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

I. NUMA SYSTEM

A. System Overview

Figure 1:
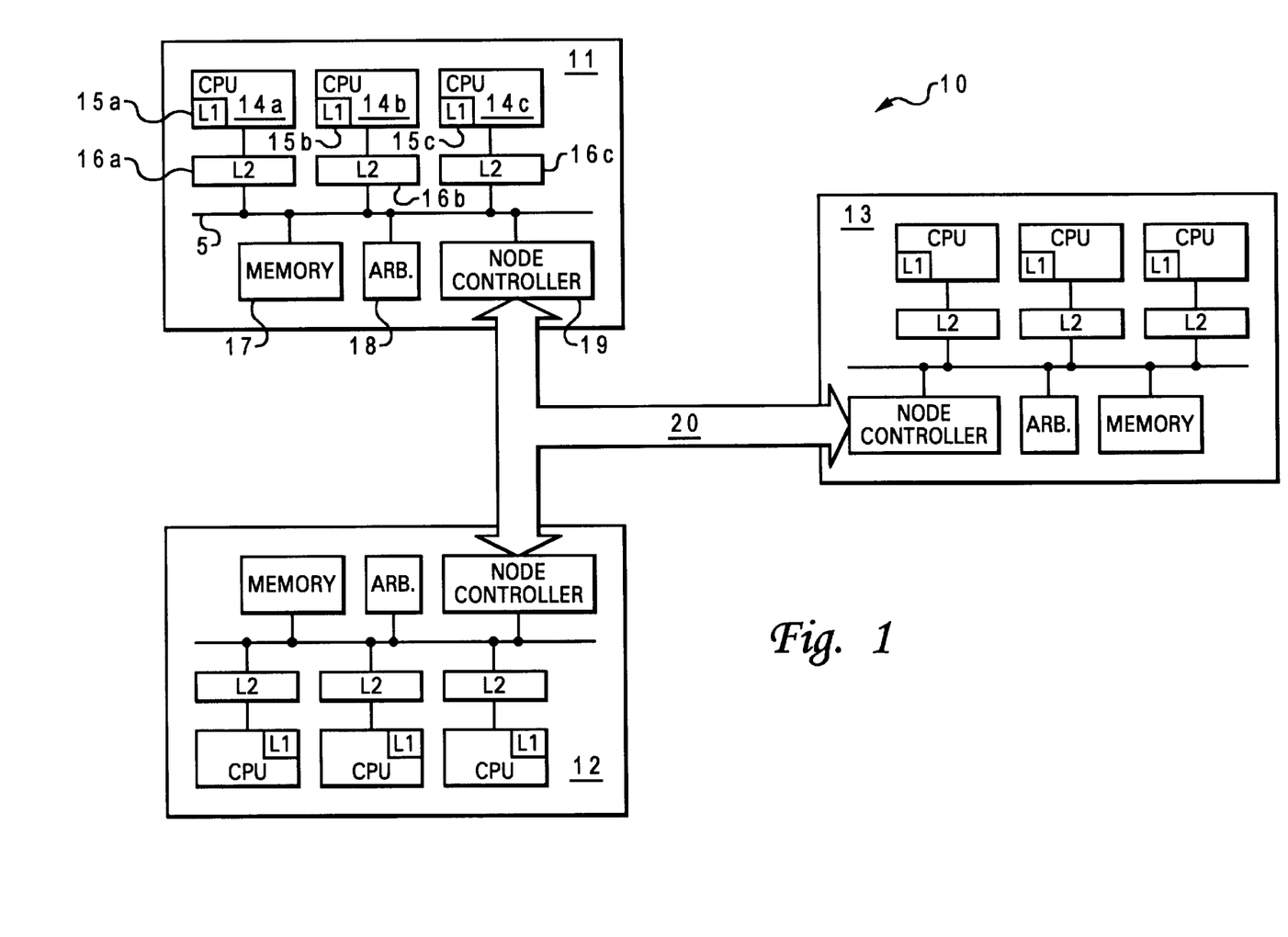
FIG. 1 is a block diagram of a non-uniform memory access (NUMA) computer system in accordance with a preferred embodiment of the present invention.

Referring now to the drawings and in particular to FIG. 1, there is illustrated a block diagram of a non-uniform memory access (NUMA) computer system in accordance with a preferred embodiment of the present invention. The depicted embodiment can be realized, for example, as a workstation, a midrange computer, or a mainframe computer. As illustrated, a NUMA computer system 10 includes processing nodes 11, 12, and 13 that are interconnected by a node interconnect 20. Each of processing nodes 11–13 includes at least one processor. For example, processing node 11 includes processors 14a–14c, all of which are preferably identical with each other.

In addition to registers, instruction flow logic and execution units utilized to execute program instructions, each of processors 14a–14c also includes a respective one of on-chip level one (L1) caches 15a–15c, which together with a respective one of level two (L2) caches 16a–16c is utilized to stage data to one of associated processors 14a–14c from a system memory 17. In other words, L1 caches 15a–15c and L2 caches 16a–16c function as intermediate storage between system memory 17 and processors 14a–14c for data that are likely to be accessed again by one of processors 14a–14c. L2 caches 16a–16c typically have a much larger storage capacity than L1 caches 15a–15c, but at a longer access latency. For example, L2 caches 16a–16c may have a storage capacity of 1–16 megabytes, while L1 caches 15a–15c may only have a storage capacity of 8–32 kilobytes. Although L2 caches 16a–16c are illustrated in FIG. 1 as external to processors 14a–14c, it should be understood that each of L2 caches 16a–16c could alternatively be incorporated within an associated one of processors 14a–14c as another level of on-chip cache memory. Furthermore, it should be understood that additional levels of cache memory (such as level 3, level 4, etc.) could be utilized to provide additional data storage. In this disclosure, each of processors 14a–14c and its associated cache hierarchy, i.e., L1 caches and L2 caches, is considered to be a single snooper.

In addition, each of processing nodes 11–13 further includes a respective node controller, such as a node controller 19 for processing node 11. Together with system memory 17 and L2 caches 16a–16c, node controller 19 is coupled to a local interconnect 5. Node controller 19 serves as a local agent for remote processing nodes 12 and 13 by performing at least the following two functions: (1) node controller 19 snoops communication transactions on local interconnect 5 and facilitates the transmission of relevant local communication transactions to the remote processing nodes 12 and (2) node controller 19 snoops communication transactions on node interconnect 20 and masters relevant communication transactions on an associated local interconnect such as local interconnect 5. Communication on each local interconnect, such as interconnect 5, is controlled by an arbiter, such as arbiter 18. Arbiter 18 regulates any access to local interconnect 5 based on bus request signals generated by any one of processors 14a–14c and compile coherency responses for snooped communication transactions on local interconnect 5. The coherence response phase of local interconnect 5 can be postponed by a ReRun coherence response. Transactions receiving a ReRun response are said to have been ReRun'd. When the device that issued the ReRun response is ready to complete the transaction, it issues a ReRun transaction, with the tag of the original ReRun'd transaction, to local interconnect 5. The ReRun transaction causes the original requester to reissue the transaction at which time the coherence response phase can be completed.

Each of processing nodes 11–13 within NUMA computer system 10 may further include additional devices such as I/O devices (e.g., a display device, keyboard, or graphical pointer), non-volatile storage for storing an operating system and application software, and serial and parallel ports for connection to networks or attached devices. However, such devices are not deemed necessary for the understanding of the present invention and are accordingly omitted in order to avoid obscuring the illustration of the present invention.

B. Memory Organization

All of the processors in NUMA computer system 10, such as processors 14a–14c, share a single physical memory space, meaning that each physical address is associated with only a single system memory location. Thus, the overall contents of system memory, which can generally be accessed by any of the processors within NUMA computer system 10, can be viewed as partitioned between all the system memories. Taking the illustrative embodiment shown in FIG. 1 as an example, processor 14a addresses a 16 gigabyte address space including both a general purpose memory area and a reserved area. The general purpose memory area is preferably divided into 500 megabyte segments, with each of processing nodes 11–13 being allocated every third segment. The reserved area, which may contain approximately 2 gigabyte, includes system control and peripheral memory and I/O areas that are each allocated to a respective one of processing nodes 11–13.

For purposes of illustration, a processing node (such as processing node 11) that stores a particular datum in its system memory is said to be the home node for that datum. Conversely, the remaining processing nodes within the NUMA computer system (such as processing nodes 12 and 13) are said to be remote nodes with respect to the particular datum.

C. Memory Coherency

Because data stored within a local system memory, such as system memory 17, can be requested, accessed, modified, and cached by any one of processing node 11–13 within NUMA computer system 10, NUMA computer system 10 implements a cache coherency protocol to maintain coherency both between cache memories within the same local processing node and between cache memories within other remote processing nodes. Thus, NUMA computer system 10 can be properly classified as a cache coherent NUMA (CC-NUMA) computer system. The cache coherence protocol, most likely implementation-dependent, may comprise, for example, the well-known Modified, Exclusive, Shared, and Invalid (MESI) protocol or a variant thereof. Hereafter, it will be assumed that L1 caches 15a–15c, L2 caches 16a–16c, and arbiter 18 implement a modified MESI protocol, of which node controller 19 recognizes the Modified, Shared and Invalid states and consider the Exclusive state to be merged into the Modified state for correctness. In other words, node controller 19 assumes that data held exclusively by a remote cache is modified, regardless of whether or not the data has actually been modified.

D. Node Controller

Figure 2:
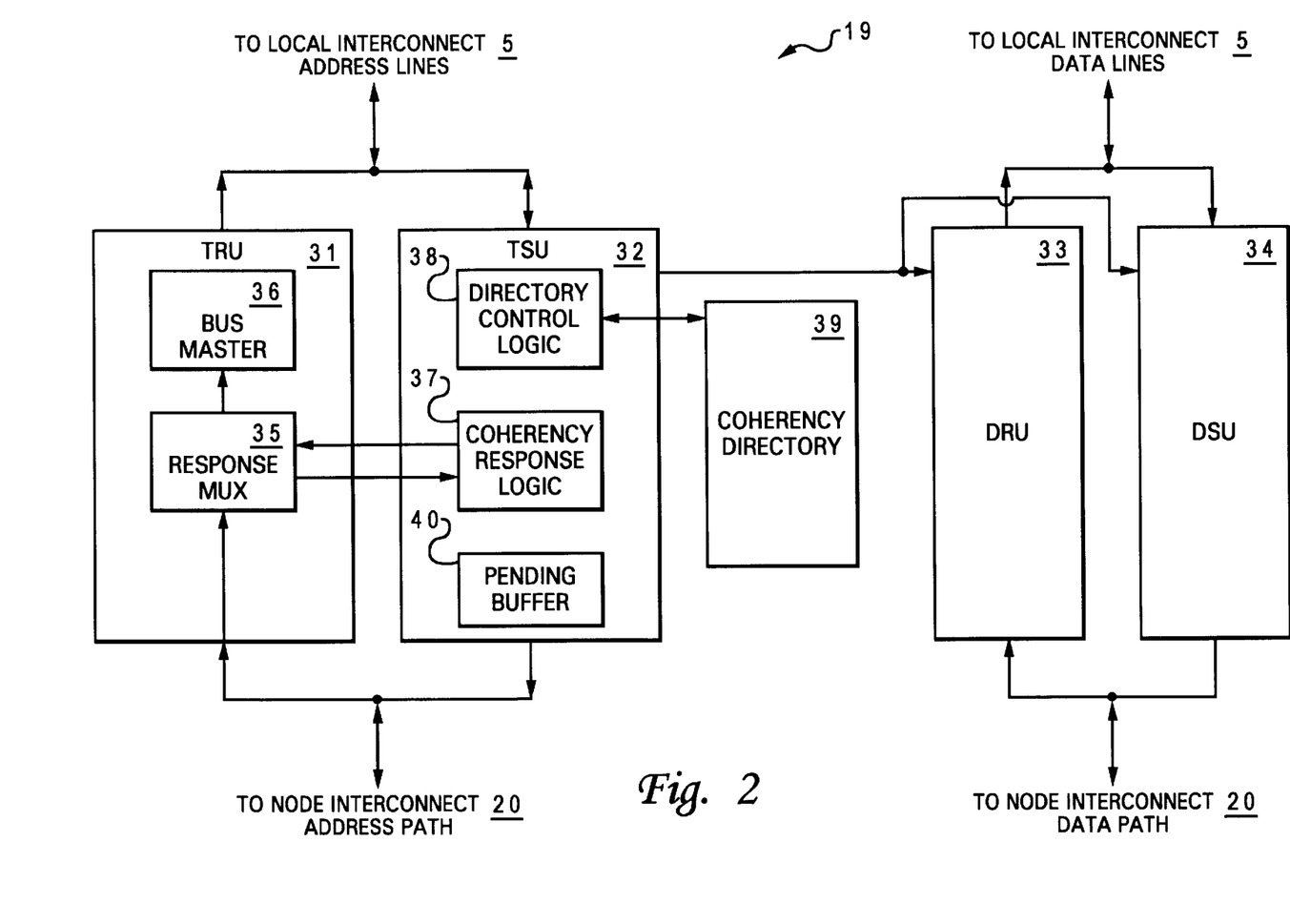
FIG. 2 is a detailed block diagram of a node controller in the NUMA computer system of FIG. 1.

With reference now to FIG. 2, there is illustrated a detailed block diagram of a node controller 19 in NUMA computer system 10 of FIG. 1. As shown, node controller 19, which is coupled between a local interconnect 5 and node interconnect 20, includes a transaction receive unit (TRU) 31, a transaction send unit (TSU) 32, a data receive unit (DRU) 33, and a data send unit (DSU) 34. As indicated, the address and data paths through node controller 19 are bifurcated, with address packets being processed by TRU 31 and TSU 32 and data packets being processed by DRU 33 and DSU 34.

TRU 31, which is so designated to indicate transaction flow off of node interconnect 20, is responsible for accepting address and coherency packets from node interconnect 20, issuing transactions on local interconnect 5, and forwarding responses to TSU 32. TRU 31 includes a response multiplexer 35, which receives packets from node interconnect 20 and passes selected packets to both bus master 36 and coherency response logic 37 within TSU 32. In response to receipt of a address packet from response multiplexer 35, bus master 36 may initiate a communication transaction on its local interconnect 5 that is the same as or different from the received address packet.

TSU 32, as indicated by its nomenclature, is a conduit for transactions flowing to node interconnect 20. TSU 32 includes a multiple-entry pending buffer 40 that temporarily stores attributes of communication transactions sourced to node interconnect 20 that have yet to be completed. The transaction attributes stored in an entry of pending buffer 40 preferably include at least the address (including tag) of the transaction, the type of the transaction, and the number of expected coherency responses from remote node who's caches may hold the line. A tag is a transaction identifier used to uniquely identify an active transaction in the system, and associate address transaction, and data on spit buses. Each pending buffer entry has an associated status, which can be set either to Null, indicating that once all responses are received that the pending buffer entry can be deleted, or to ReRun, indicating that TSU 32 should instruct TRU 31 to issue a ReRun request for the held tag once all responses are received. In addition to sourcing address packets on node interconnect 20, TSU 32 interacts with TRU 31 to process memory request transactions and issues commands to DRU 33 and DSU 34 to control the transfer of data between local interconnect 5 and node interconnect 20. TSU 32 also implements the modified coherency protocol (i.e., MSI protocol) for node interconnect 20 with coherency response logic 37 and maintains coherence directory 39 with directory control logic 38.

TABLE I

| Coherence directory state | Possible state(s) in local cache | Possible state(s) in remote cache | Meaning |
| --- | --- | --- | --- |
| Modified (M) | I | M, E, or I | Cache line may be modified at a remote node |
| Shared (S) | S or I | S or I | Cache line may be held non-exclusively at a remote node |
| Invalid (I) | M, E, S, or I | I | Cache line is not held by any remote node |
| Pending-shared | S or I | S or I | Cache line is in the process of being invalidated at remote nodes |
| Pending-modified | I | M, E, or I | Cache line, which may be modified at a remote node, is in the process of being written back to a system memory at the home node, possibly with invalidation at the remote node |

Coherence directory 39 stores indications of the system memory addresses of all data (e.g., cache lines) held by caches at remote nodes for which the local processing node is the home node. The address indication for each cache line is stored in association with an identifier of each remote processing node having a copy of the cache line and the coherency status of the cache line at each such remote processing node. Possible coherency states for entries in coherence directory 39 are summarized in Table I. As indicated in Table I, the knowledge of the coherency states of cache lines held by remote processing nodes is imprecise. This imprecision is due to the fact that a cache line held remotely can make a transition from S to I, from E to I, or from E to M without notifying the node controller of the home node.

E. Collision Detection

The piplined nature of the address bus and the ability to extend coherency to a remote bus via a ReRun response cause complexity in the determination of a completion of a transaction and in the serialization of transactions that need to be serialized (or prioritized). Transactions that may interact and need to be serialized are said to "collide" with each other, and one of the transactions must be retried in accordance with the collision detection rules. Generally speaking, if an agent (such as a node controller) issues a memory request that is not ReRun'd, the agent is responsible for collision detection until the memory request is completed. If a request is ReRun'd, the agent that issues the ReRun response assumes responsibility for collision detection until the transaction is reissued by the original agent in response to a ReRun transaction indicating that the delayed coherency response for the transaction can now be resolved by the system.

II. LIVELOCK PROBLEM

The occurrence of a livelock situation on a multiprocessor bus is a common problem that must be prevented. Livelocks can occur when two agents on the bus are trying to access the same cache line. Typically, the bus has a detection protocol for detecting collisions and rules for ensuring coherency such that colliding transaction will be retried. However, it is possible that, under certain scenarios, two colliding transactions may continue to retry each other and no progress can be made. In the prior art, there are mechanisms to avoid livelocks through random delay before a Retry'd transaction is issued again. The delay length is a function of the time for the coherence to be resolved on the bus. In a SMP single bus computer system, this delay tends to be on the order of a few ten's of cycles. In a NUMA computer system, the additional delay introduced by the interconnect crossing and the time to resolve the coherency is long enough to prevent the SMP livelock solution from being effective in these larger systems. Therefore, a better solution to a livelock problem is required for the NUMA computer system.

Typically, if a processor reading a cache line is currently the only reader, then the cache line is given to the reading processor in an Exclusive state. Under the Exclusive state, the reading processor may modify the cache line without notifying the NUMA computer system. As such, the cache coherency directory within the NUMA computer system must assume that the reading processor has in fact modified the cache line and mark the cache line as Modified. However, if the reading processor did not actually modify the cache line and had instead silently cast the cache line from its cache without informing the cache coherency directory, the cache coherency directory would still indicate that the processor has the cache line modified and is the "owner" of the "modified" cache line. As a result, subsequent accesses to the cache line will be forwarded to the owning processor's node. A livelock situation can occur if a processor from a node other than the node of the owning processor (i.e., the owning node) attempts to access the cache line at the same time a processor at the owning node attempts to access the same cache line again.

Figure 3:
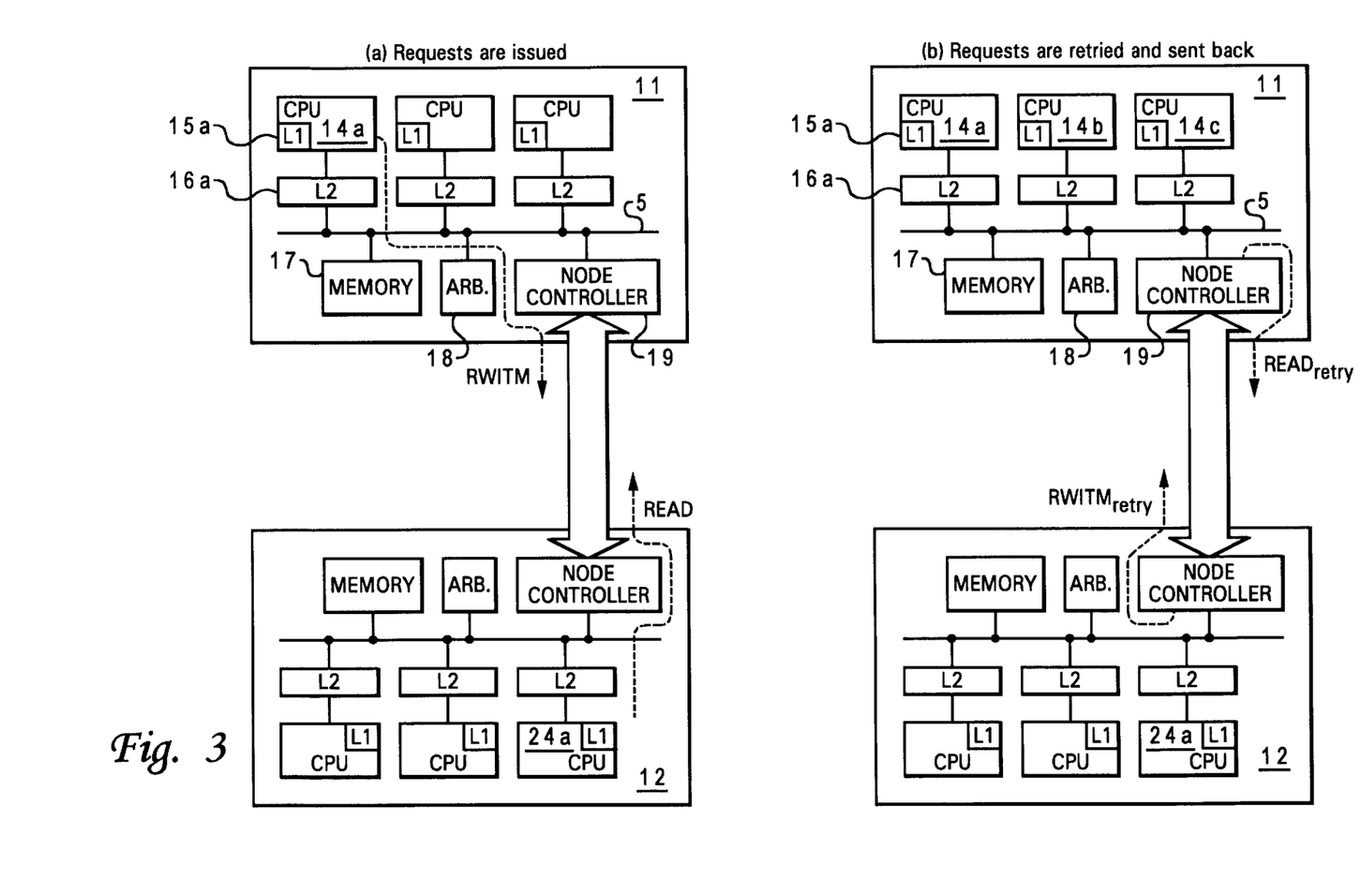
FIGS. 3a and 3b together depict an illustrative example of a livelock situation caused by invalidating transactions.

Referring now to FIGS. 3a and 3b, there is depicted an illustrative example of a livelock situation caused by stale Exclusive/Modified directory entries within a NUMA system as mentioned above. As shown in FIG. 3a, a processor 14a at a home node 11 issues a RWITM request to a cache line that has been silently cast out as mentioned above. Node controller 19 will then forward the RWITM request to remote node 12 because the coherency directory within node controller 19 still indicates the state of the cache line as Modified in remote node 12, and node controller 19 will change the coherency state of the cache line to Pending-Modified. Remote node 12, in this example, is the owning node. At the same time, a processor 24a located at remote node 12 (i.e., the owning node of the cache line in question) is attempting to read the same cache line again by issuing a READ request for the cache line, as shown in FIG. 3a.

When the READ request from processor 24a of remote node 12 arrives at home node 11, the READ request will be Retry'd because the READ request collides with the outstanding RWITM request from processor 14a of home node 11, which has been ReRun'd and forwarded to remote node 12. When the RWITM request from processor 14a of home node 11 reaches remote node 12, the RWITM request will also be Retry'd because the RWITM request collides with the outstanding READ request to home node 11. Once the RWITM request sent by node controller 19 of home node 11 is returned with a Retry, node controller 19 will change the coherency state of the cache line from a Pending-Modified state to a Modified state, and processor 14a of home node 11 will reissue the RWITM request. When processor 24a of remote node 12 receives the Retry of its READ request, processor 24a will reissue the READ request, as shown in FIG. 3b. This cycle will repeat, and as a result, a livelock situation may occur.

III. SOLUTION TO LIVELOCK PROBLEM

The solution to the livelock problem lies in the fact that cache coherency directory within node controller 19 has sufficient information to determine whether a transaction is received from what is assumed to be the owning node of the cache line. If the coherency state of the cache line is in a Pending-Modified state, an attempt has been made to fetch the cache line back. If a request from the current owning node is received with a clean response, indicating that no processor at any node has the cache line modified, the coherency state of the cache line can then be moved from a Pending-Modified state to a Pending-Shared state. When the READ request to the owning node is returned with a Retry response, the coherency state of the cache line will be moved back to a Shared state rather than a Modified state. For subsequent accesses, the cache coherency directory will indicate that the cache line is held in the home node system memory 17.

Figure 4:
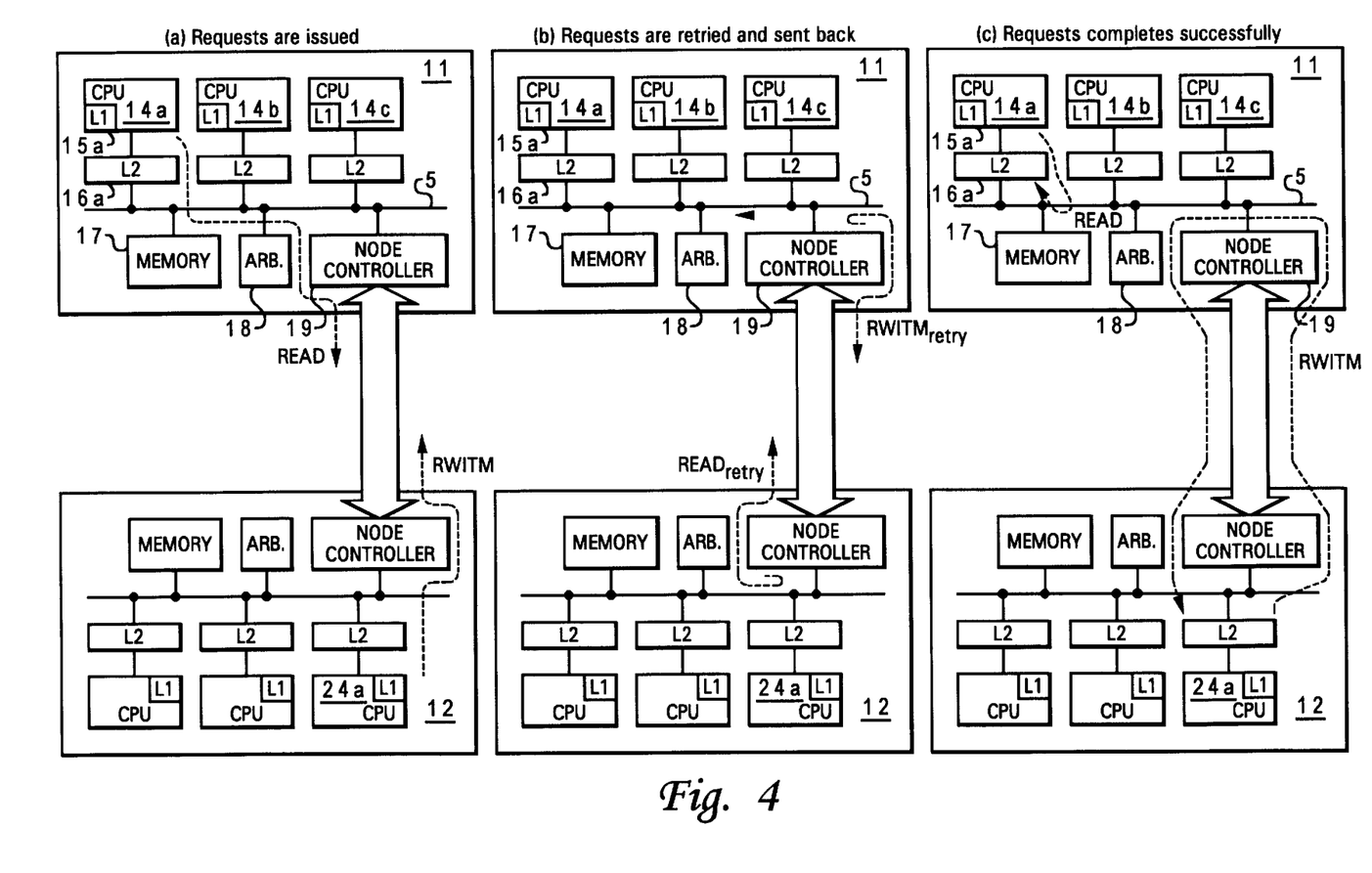
FIGS. 4a, 4b and 4c together depict an illustrative example of a solution to the livelock situation caused by stale Exclusive/Modified directory entries, in accordance with a preferred embodiment of the present invention.

With reference now to FIGS. 4a–4c, there is depicted an illustrative example of the solution to the above-mentioned livelock situation, in accordance with a preferred embodiment of the present invention. As shown in FIG. 4a, processor 14a of home node 11 issues a READ request to remote node 12. At the same time, processor 24a of remote node 12 issues a RWITM request to home node 11. When the RWITM request is received at home node 11, node controller 19 can determine by accessing its cache coherency directory that the RWITM request is received with a clean response from what is assumed to be the owning node of the cache line because the coherency state of the cache line is in a Pending-Modified state with remote node 12 as the owning node. The coherency state of the cache line is then changed from a Pending-Modified state to a Pending-Shared state, which indicates local system memory 17 is consistent. When the READ request issued by home node 11 is returned with a Retry, as shown in FIG. 4b, the coherency state of the cache line will be moved by node controller 19 from a Pending-Shared state to a Shared state. When READ request is reissued at home node 11 it will find the state to be Shared, and the Read request will complete successfully at home node 11 with the data supplied by system memory 17 at home node 11, as shown in FIG. 4c. The RWITM is now able to complete.

Figure 5:
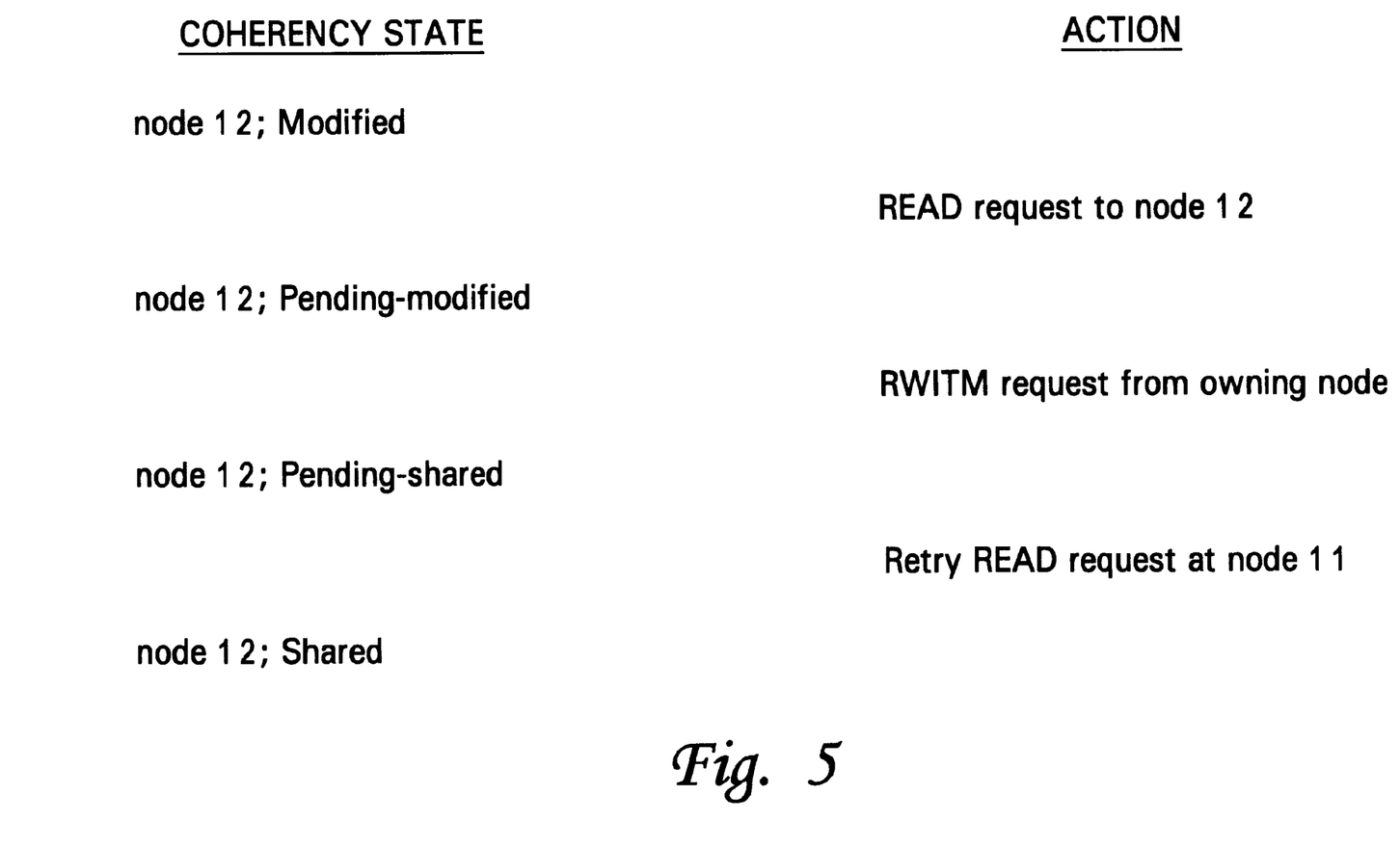
FIG. 5 is a summary of various coherency states of the requested cache line within the coherency directory of a node controller during the resolution of the livelock situation shown in FIGS. 4a–4c, in accordance with a preferred embodiment of the present invention.

Referring now to FIG. 5, there is depicted a summary of various coherency states of the requested cache line within the coherency directory during the resolution of the livelock situation shown in FIGS. 4a–4c, in accordance with a preferred embodiment of the present invention. Initially, the cache line is indicated by the node controller's coherency directory to be in a Modified state (although the cache line has been silently invalidated at the owning node). After a READ request for the cache line, the coherency state of the cache line changes from a Modified state to a Pending-Modified state. When a RWITM request arrives from the owning node (i.e., remote node 12), the coherency state of the cache line moves from a Pending-Modified state to a Pending-Shared state. When the READ request issued by home node 11 is returned to node 11 with a Retry, the coherency state of the cache line moves from a Pending-Shared state to a Shared state. The stale directory entry has been updated, and a potential livelock avoided.

As has been described, the present invention provides an improved method and apparatus for avoiding protocol livelocks due to stale exclusive/modified directory entries within a non-uniform memory access computer system.

While the invention has been particularly shown and described with reference to a preferred embodiment, it will be understood by those skilled in the art that various changes in form and detail may be made therein without departing from the spirit and scope of the invention.

What is claimed is:

1. A method for avoiding livelocks due to stale exclusive/modified directory entries within a non-uniform memory access (NUMA) computer system, wherein said NUMA computer system includes at least two nodes coupled to an interconnect and each of said at least two nodes includes a local system memory, said method comprising the steps of:

in response to an attempt by a processor of a first node to read a cache line at a time substantially simultaneously to an attempt by a processor of a second node to access said cache line, wherein said cache line has been silently cast out from a cache memory within said second node even though a coherency directory within said first node still indicates said cache line is held exclusively or modified at said second node, allowing a directory within said second node to be updated from a Pending-Modified state to a Pending-Shared state after the receipt of the request from said first node is received with a clean response; and allowing said processor of said first node to access said cache line.

2. The method according to claim 1, wherein said first node is a home node and said second node is a remote node.

3. The method according to claim 1, wherein said first node and said second node are remote nodes.

4. The method according to claim 1, wherein said access by said processor of said second node is any request that requires data to be flushed from the owning node.

5. The method according to claim 1, wherein said cache line is held in a Modified state.

6. A non-uniform memory access (NUMA) computer system capable of avoiding livelocks due to stale exclusive/modified directory entries, wherein said NUMA computer system includes at least two nodes coupled to an interconnect and each of said at least two nodes includes a local system memory, comprising:

means for allowing a directory within a second node to be updated from a Pending-Modified state to a Pending-Shared state after the receipt of the request from a first node is received with a clean response, in response to an attempt by said processor of said first node to read a cache line at a time substantially simultaneously to an attempt by said processor of said second node to access said cache line, wherein said cache line has been silently cast out from a cache memory within said second node even though a coherency directory within said first node still indicates said cache line is held exclusively or modified at said second node; and means for allowing said processor of said first node to access said cache line.

7. The NUMA computer system according to claim 6, wherein said first node is a home node and said second node is a remote node.

8. The NUMA computer system according to claim 6, wherein said first node and said second node are remote nodes.

9. The NUMA computer system according to claim 6, wherein said access by said processor of said second node is any request that requires data to be flushed from the owning node.

10. The NUMA computer system according to claim 6, wherein said cache line is held in a Modified state.

* * * * *